(12) United States Patent
Clune

(10) Patent No.: US 6,224,807 B1
(45) Date of Patent: May 1, 2001

(54) METHODS OF MOLDING FASTENERS AND OF FORMING FASTENER MOLDS

(75) Inventor: William Clune, Concord, NH (US)

(73) Assignee: Velcro Industries B.V. (AN)

( * ) Notice: Subject to any disclaimer, the term of this patent is extended or adjusted under 35 U.S.C. 154(b) by 0 days.

(21) Appl. No.: 09/276,607

(22) Filed: Mar. 25, 1999

(51) Int. Cl.$^7$ ............................. B29C 33/42; B23H 1/04
(52) U.S. Cl. ................... 264/219; 264/297.1; 264/297.8; 219/69.17
(58) Field of Search ................. 264/219, 297.8, 264/297.1; 219/69.17

(56) References Cited

U.S. PATENT DOCUMENTS

| | | |
|---|---|---|
| 3,089,191 | 5/1963 | Conrad . |
| 3,312,583 | 4/1967 | Rochlis . |
| 3,507,010 | 4/1970 | Doleman . |
| 3,555,601 | 1/1971 | Price . |
| 3,752,619 | 8/1973 | Menzin et al. . |
| 3,758,657 | 9/1973 | Menzin et al. . |
| 3,762,000 | 10/1973 | Menzin et al. . |
| 3,917,772 | 11/1975 | Hollenbeck . |
| 4,315,885 | 2/1982 | Lemelson . |
| 4,775,310 | 10/1988 | Fischer . |
| 4,794,028 | 12/1988 | Fischer . |
| 4,872,243 | 10/1989 | Fischer . |
| 4,984,339 | 1/1991 | Provost et al. . |
| 5,180,534 | 1/1993 | Thomas et al. . |
| 5,247,151 | * 9/1993 | Hagerman ..................... 219/69.17 |
| 5,884,374 | * 3/1999 | Clune ..................................... 24/446 |
| 5,922,222 | * 7/1999 | Jens et al. ........................ 219/69.17 |

* cited by examiner

Primary Examiner—Mathieu D. Vargot
Assistant Examiner—Suzanne E. McDowell
(74) Attorney, Agent, or Firm—Fish & Richardson, P.C.

(57) ABSTRACT

A method is provided for making a mold cavity for forming a fastener element having a predetermined shape including an undercut portion. The method includes: (a) providing a mold body having a surface; (b) providing a shaped electrode, the shape of the electrode being selected to enable the predetermined shape of the mold cavity to be described by motions of the electrode; (c) moving the shaped electrode into the surface of the mold body to form an initial opening in the mold body; (d) moving the shaped electrode within the initial opening in a set of motions referenced to multiple axes to enlarge the initial opening and form the predetermined shape of the mold cavity; and (e) removing the shaped electrode from the mold body. Methods of molding fastener elements are also provided.

14 Claims, 5 Drawing Sheets

METHODS OF MOLDING FASTENERS AND OF FORMING FASTENER MOLDS

BACKGROUND OF THE INVENTION

The present invention relates to methods of molding fasteners, e.g., the hook component of a hook and loop fastener, and methods of making molds to perform such molding.

Molded hook and loop fasteners include an array of fastener elements integrally molded with and extending from a base. The fastener elements are formed in small mold cavities in a molding device. The mold cavities typically include undercuts for molding loop-engaging shapes such as hooks or mushroom heads.

Often the mold cavities in which the elements are formed have no moving parts, the fastener elements being pulled from the mold cavities by resiliently distorting the molded fastener elements. A running strip of fastener elements is generally molded on a rotating mold roll, e.g., as described in U.S. Pat. No. 4,794,028, the disclosure of which is incorporated by reference herein. For discrete items, cyclable injection molding techniques are employed. In either case, the mold comprises a stack of thin plates which, when in correct registration, define a plurality of mold cavities. Each of the thin plates includes a portion of the mold cavity, taken along an axial cross-section through the cavity, so that when the plates are properly aligned these portions align to define a complete mold cavity.

SUMMARY OF THE INVENTION

The present invention features methods of molding fasteners and of forming a molding cavity for manufacturing a fastener element. The mold cavities used in the methods of the invention are formed in a single, integral mold body, without the use of stacked plates. In preferred embodiments, an electrode is used, e.g., in an Electrodischarge Machining (EDM) process, to machine the desired mold cavity shape into the mold body. This technique allows mold cavities for fastener elements to be easily manufactured, and facilitates the manufacture of mold cavities having complex shapes, e.g., for helical fastener elements. Moreover, when using a mold according to the invention it is not necessary to align a stack of plates, nor to keep the stack in correct registration during the molding process.

In one aspect, the invention features a method of making a mold cavity for forming a fastener element having a predetermined shape including an undercut portion. The method includes (a) providing a mold body having a surface; (b) providing a shaped electrode, the shape of the electrode being selected to enable the predetermined shape of the mold cavity to be described by motions of the electrode; (c) moving the shaped electrode into the surface of the mold body to form an initial opening in the mold body; (d) moving the shaped electrode within the initial opening in a set of motions referenced to multiple axes to enlarge the initial opening and form the predetermined shape of the mold cavity; and (e) removing the shaped electrode from the mold body.

Preferred embodiments include one or more of the following features. The step of moving the shaped electrode includes moving the electrode into the surface in a direction substantially perpendicular to the surface. The step of moving the shaped electrode within the initial opening in a set of motions includes moving the shaped electrode substantially parallel to the surface. The step of moving the shaped electrode within the initial opening includes rotating the shaped electrode. The step of removing the shaped electrode includes returning the shaped electrode through the set of motions. The step of moving the shaped electrode within the initial opening in a set of motions includes the set of motions of: (a) moving the shaped electrode in a first direction substantially parallel to the surface from a first position in the initial chamber to a second position in the mold body; and, (b) moving the shaped electrode in a second direction substantially parallel to the surface from the second position past the first position to a third position in the mold body. The method further includes the step of providing a shaped electrode wherein the shaped electrode has an elongated shaft and a curved tip. The shaped electrode has a length at least as deep as the cavity to be formed. The shaped electrode has at least one transverse dimension that is smaller than the corresponding dimension of the cavity to be formed.

In another aspect, the invention features a method for molding a fastener element having a predetermined shape, including: (a) providing a mold body having a surface; (b) providing a shaped electrode having a length at least as deep as the cavity to be formed and having at least one transverse dimension smaller than the corresponding dimension of the cavity to be formed, the shape of the electrode selected to enable the predetermined shape of the cavity to be described by motions of the electrode; (c) moving the shaped electrode into the surface of the mold body to form an initial chamber in the mold body; (d) moving the shaped electrode within the initial chamber in a set of motions to form the a stem portion and a head portion corresponding to the predetermined shape of the fastener element and to enlarge the initial chamber to form the cavity; (e) returning the shaped electrode to remove the shaped electrode from the mold body; (f) delivering moldable resin to the cavity such that moldable resin is forced into the cavity; (g) solidifying the resin in the cavity to form a fastener element; and (h) removing the fastener element from the cavity.

Preferred embodiments include one or more of the following features. The predetermined shape includes a stem and a head, the head being shaped for engagement with a loop of a hook and loop fastener.

Other features and advantages of the invention will be apparent from the following description of a presently preferred embodiment, and from the claims.

DESCRIPTION OF THE PREFERRED EMBODIMENTS

Figure 1:
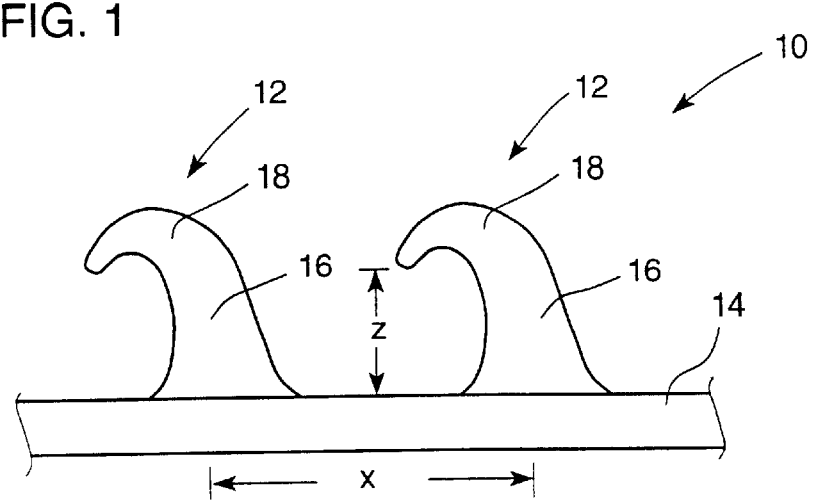
FIG. 1 is a side view of a hook component of a hook and loop fastener.

Referring to FIG. 1, a fastener 10 includes a plurality of fastener elements 12 formed integrally with a base sheet 14.

Each fastener element 12 includes a stem 16 extending upward from the base 14 and terminating in a head 18 located a distance of Z above the base 14. Head 18 is shaped for engagement with loops of a mating loop fastener (not shown). Fastener elements 12 are separated by a distance of X between their respective centerlines in the machine direction of the base sheet 14. The fastener elements 12 and base sheet 14 are molded in mold cavities that are created using a shaped electrode in an EDM process, as will be described in further detail below. The electrode is shaped so that mold cavities having the shape of fastener elements 12 can be formed by motions of the electrode.

Figure 2:
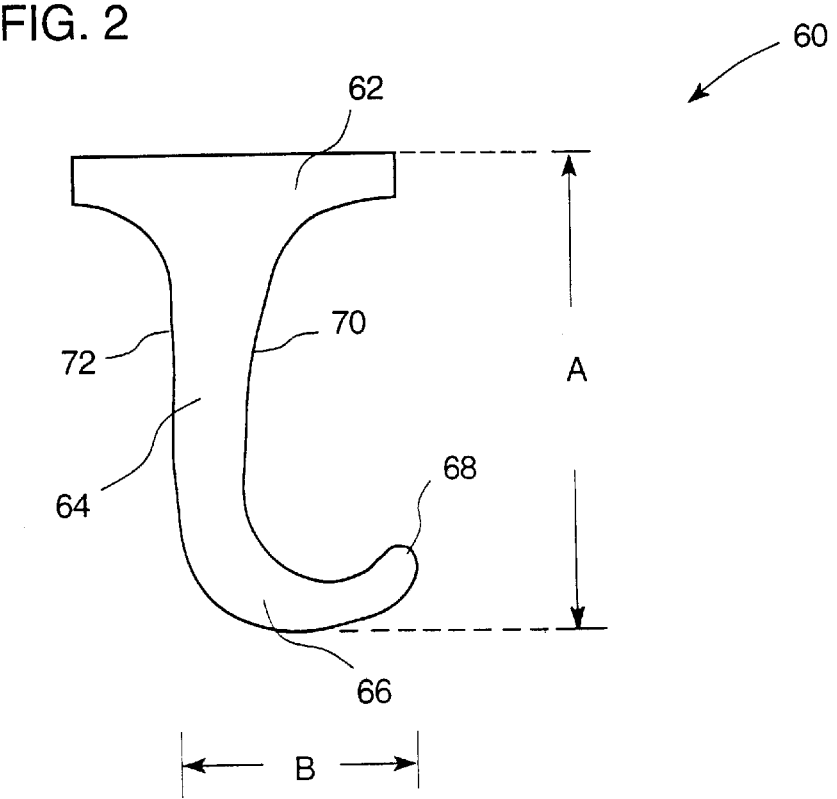
FIG. 2 is a side view of a shaped electrode for use in an EDM process according to one aspect of the invention.

FIG. 2 shows an electrode 60 that is suitably shaped for machining mold cavities that have the shape of fastener elements 12. To form the mold cavity, the shaped electrode 60 is plunged into the surface of a mold body 130 and moved through a sequence of movements. The shaped electrode is preferably mounted on, and moved by, an EDM machine, more preferably a 5-Axis EDM machine, commercially available from Sodick. The EDM machine moves the electrode 60 within the initial opening in a pattern, referenced to multiple axes, that enlarges the initial opening and configures the desired mold cavity shape. The EDM machine then returns electrode 60 to its initial position, withdrawing it from the cavity by reversing the sequence of movements that created the mold cavity. This machining process will be described in further detail below with reference to FIGS. 3–3F and 4–C.

The electrode 60 includes a support section 62 integrally formed with a downwardly extending and elongated shaft 64, and a hooked portion 66 that terminates at electrode tip 68. Electrode tip 68 is constructed to be plunged into the surface of a mold cavity, and to remove material from the mold body during the formation of a mold cavity. Shaft section 64 includes first and second sides 70, 72 which also remove material during the formation of a mold cavity using the electrode. The shaped electrode 60 has an overall length A from the top of the support section 62 to the bottom surface of the hooked portion 66. The length A is selected to be at least as deep as the cavity to be formed in the mold body. The hooked portion 66 has an overall length B that is preferably smaller than the corresponding transverse dimension of the cavity to be formed, e.g., from about 10 to 30% smaller. The radius of curvature of the hooked portion is preferably substantially the same as the desired radius of curvature of the hook portion of the mold cavity. Electrode 60 can be formed of any material suitable for use in EDM machining, e.g., graphite or copper.

Figure 3:
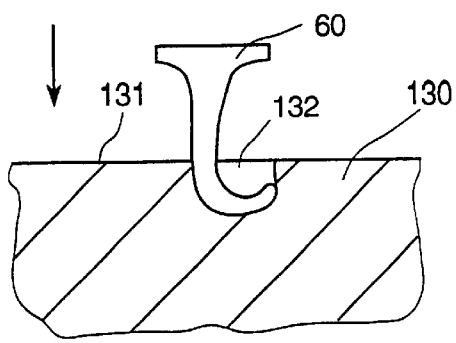
FIGS. 3–3F are diagrammatic cross-sectional views showing a shaped electrode performing a set of motions to form a mold cavity for forming a hook shaped fastener.
Figure 3A:
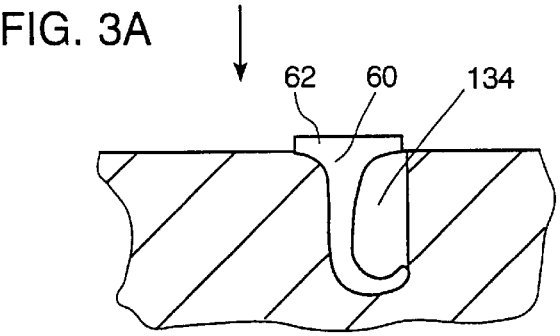
Figure 3B:
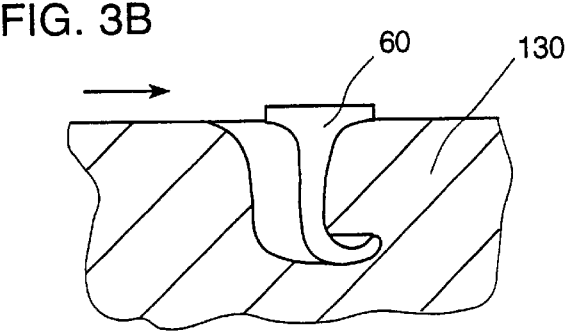
Figure 3C:
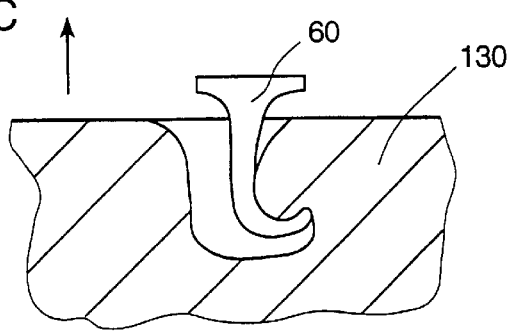
Figure 3D:
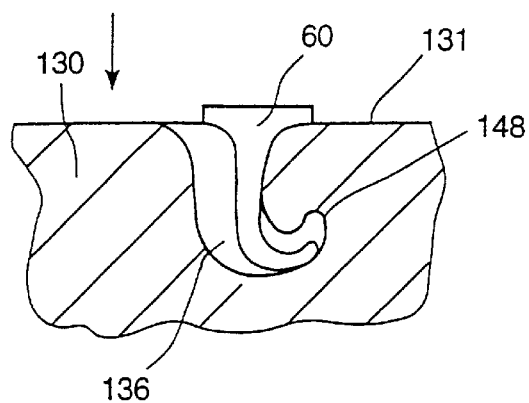
Figure 3E:
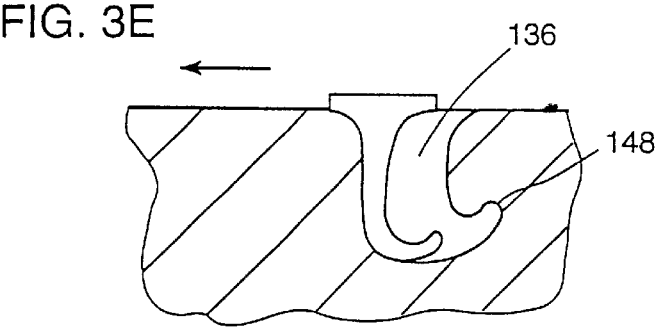
Figure 3F:
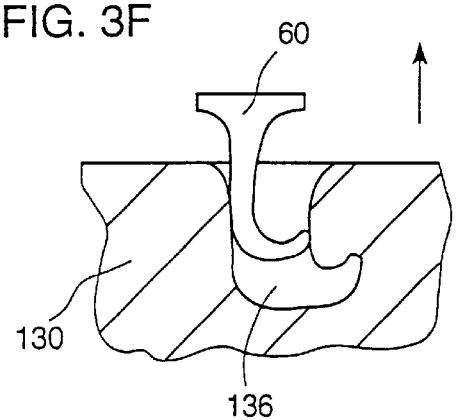

FIGS. 3–3F show a process for forming a mold cavity within a mold body 130, using an electrode 60 that is mounted on a multi-axis EDM machine. The direction of movement of the electrode is indicated by an arrow in each figure. In FIG. 3, electrode 60 is plunged into the surface 131 of the mold body 130 to form an initial opening 132. During this step, the transverse section 66 and electrode tip 68 of electrode 60 remove material in the area of the opening 132.

As shown in FIG. 3A, the electrode 60 is next plunged further into the mold body 130 until the support section 62 enters the body 130, forming a straight-sided initial cavity 134.

If it is desired to remove material from the body more quickly, in the steps shown in FIGS. 3 and 3A the hook-shaped electrode 60 can be replaced by a larger, straight electrode.

Referring now to FIG. 3B, the electrode 60 is then moved forward to widen the cavity. The curved electrode tip 68 is moved forward and creates a portion of the hook-forming portion 146 of the mold cavity. The electrode 60 is next moved upward (FIG. 3C) to form an engagement tip-forming portion 148 within the cavity. This step completes the formation of the final mold cavity 136.

Referring now to FIGS. 3D–3F, the above-described movements are now reversed, allowing electrode 60 to be "backed out" of the cavity 136.

The finished cavity 136 has dimensions and an overall shape corresponding to the desired dimensions and shape of the fastener element to be molded.

After it has been backed out of the cavity, the electrode 60 is raised above the molding body 130 so that it can be repositioned to create the next mold cavity in the mold body 130.

Figure 4:
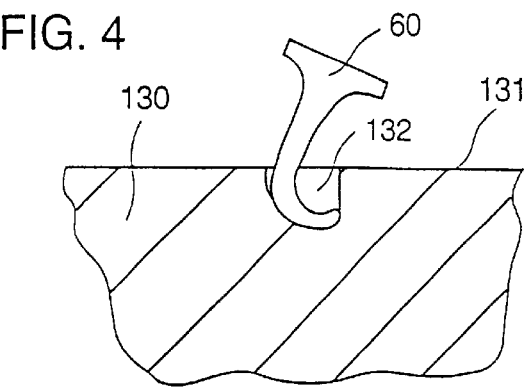
FIGS. 4–4C are diagrammatic cross-sectional views showing a shaped electrode performing an alternative set of motions to form a mold cavity for forming a hook shaped fastener.
Figure 4A:
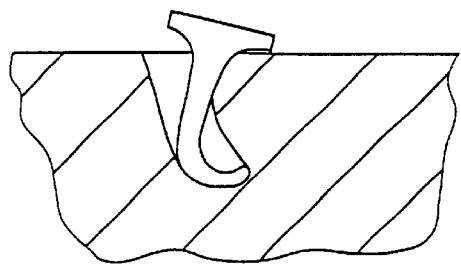
Figure 4B:
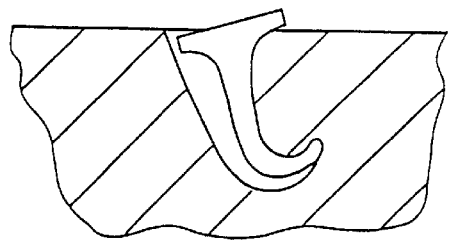
Figure 4C:
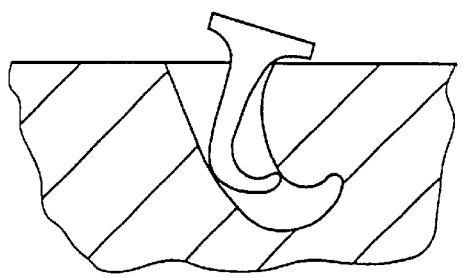

Other sequences of movements can be used to form a hook shaped mold cavity. For example, as shown in FIGS. 4–4C, the sequence of movements can include pivoting of the electrode 60 within the mold body (FIGS. 4A and 4B) during the downward movement of the electrode 60, resulting in a reduction in the number of steps required to form the cavity. This sequence of movements requires a 5-axis EDM in order to provide the necessary pivoting movement.

Figure 5:
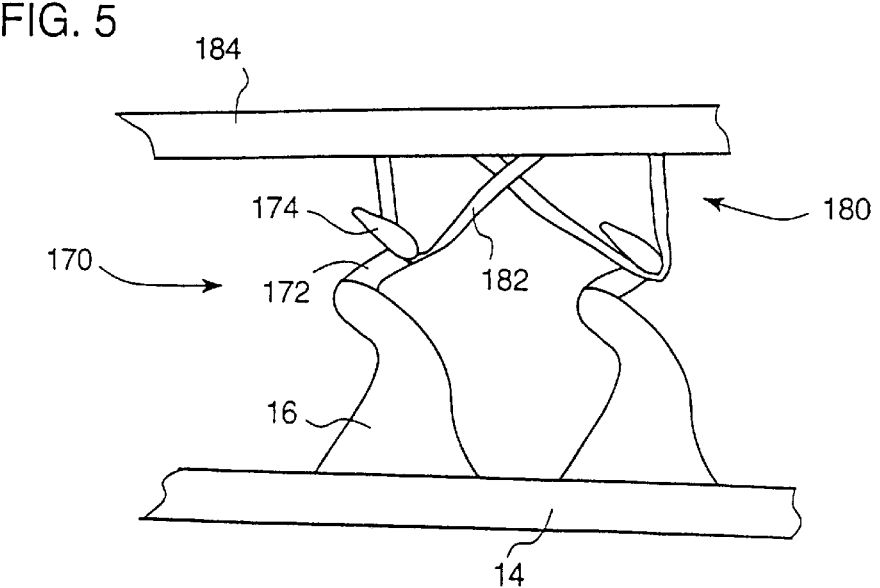
FIG. 5 is a side plan view of a pair of cork screw shaped fastener elements in engagement with loop fastener elements.

The method described above can be used to form mold cavities shaped to form other types of fastener elements. For example, the method can be used to form a corkscrew shaped fastener element 170, as shown in FIG. 5. Fastener element 170 is integrally molded to base 14 and includes a stem 16, a helical portion 172 extending from the stem 16, and an engagement tip 174 formed at the end of the helical portion 172. The helical portion 172 is stretchable and is constructed to engage a loop element 180 having loops 182 extending from a low lying fabric 184. The fastener element 170 engages a loop 182 by penetrating the loop opening with engagement tip 174. The flexibility of fastener element 170 provides for an increased resistance to disengagement from loop element 180. When loop element 180 is subjected to a disengagement force, the helical portion 172 of fastener element 170 stretches until it is substantially straight. The loop element 180 finally disengages from the fastener element 170, allowing the stretched helical portion 172 to resiliently return to its normal position.

Figure 6:
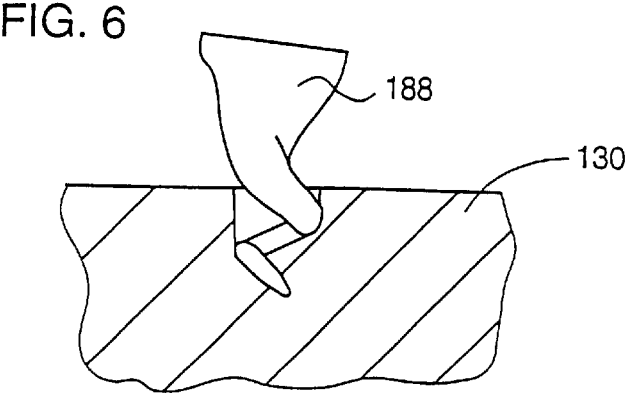
FIGS. 6, 6A and 6B are diagrammatic cross-sectional views showing a shaped electrode performing a set of motions to form a mold cavity for forming a cork screw shaped fastener element.
Figure 6A:
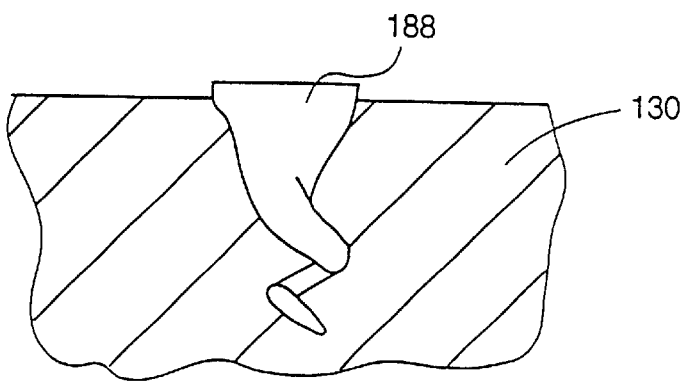
Figure 6B:
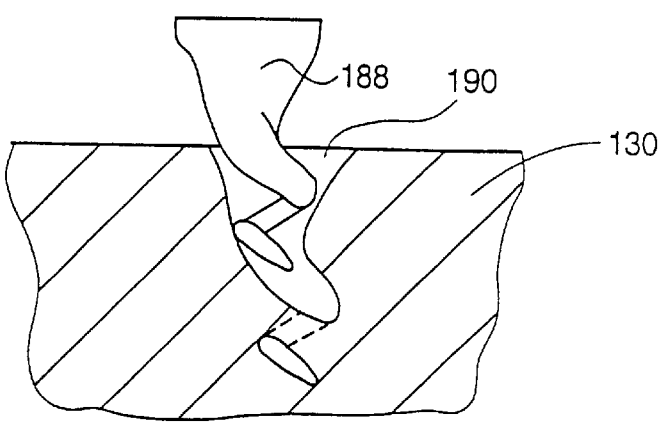

Fastener element 170 is formed in a manner similar to that described above with reference to FIGS. 3–3F, except that the electrode is moved on a helical path within the mold body. As shown in FIGS. 6 and 6A, the electrode 188 is screwed into the mold body 130, in a manner similar to insertion of a cork screw into a cork, to form the mold cavity 190. The direction of rotation of the electrode is then reversed, to back the electrode out of the cavity (FIG. 6B).

The mold cavities described above, and other mold cavities formed using the above-described methods, can be used in any desired molding process. For example, the mold cavities can be formed in a mold roll which can then be used in a continuous molding process such as that described in U.S. Pat. No. 4,794,028, incorporated by reference above. The mold cavities can also be formed in a mold suitable for use in an injection molding process.

Other embodiments are within the claims.

For example, the electrode 60 may be rotated in various directions and angular orientations within the cavity, to create other loop-engaging fastener shapes, such as spirals, double-sided hooks, or mushroom heads.

What is claimed is:

1. A method of making a mold cavity for forming a fastener element having a predetermined shape including an undercut portion, the method comprising:

providing a mold body having a surface, said mold body consisting of a single, integral mold roll;

providing a shaped electrode, the shape of the electrode being selected to enable the predetermined shape of the mold cavity to be described by motions of said electrode, said predetermined shape including a stem and a head and corresponding to the predetermined shape of the fastener element, said head being shaped for engagement with a loop of a hook and loop fastener;

moving said shaped electrode into said surface of said mold body to form an initial opening in said mold body;

moving said shaped electrode within said initial opening in a set of motions referenced to multiple axes to enlarge said initial opening and form the predetermined shape of the mold cavity; and removing said shaped electrode from said mold body.

2. The method of claim 1 wherein the step of moving said shaped electrode includes moving said electrode into said surface in a direction substantially perpendicular to said surface.

3. The method of claim 1 or 2 wherein the step of moving said shaped electrode within said initial opening in a set of motions includes moving said shaped electrode substantially parallel to said surface.

4. The method of claim 1 or 2 wherein the step of moving said shaped electrode within said initial opening includes rotating said shaped electrode.

5. The method of claim 1 wherein the step of removing said shaped electrode includes returning said shaped electrode through said set of motions.

6. The method of claim 1 wherein the step of moving said shaped electrode within said initial opening in a set of motions includes the set of motions of:

moving said shaped electrode in a first direction substantially parallel to said surface from a first position in said initial chamber to a second position in said mold body; and, moving said shaped electrode in a second direction substantially parallel to said surface from said second position past the first position to a third position in said mold body.

7. The method of claim 1 further comprising the step of providing a shaped electrode wherein said shaped electrode has an elongated shaft and a curved tip.

8. The method of claim 1 wherein said shaped electrode has a length at least as deep as the cavity to be formed.

9. The method of claim 1 wherein said shaped electrode has at least one transverse dimension that is smaller than the corresponding dimension of the cavity to be formed.

10. The method of claim 1 wherein said set of motions includes moving said electrode to form an engagement-tip forming portion in the cavity corresponding to the undercut portion of the fastener element.

11. A method for molding a fastener element having a predetermined shape, the method comprising:

providing a mold body having a surface, said mold body consisting of a single, integral mold roll;

providing a shaped electrode having a length at least as deep as the cavity to be formed and having at least one transverse dimension smaller than the corresponding dimension of the cavity to be formed, the shape of the electrode selected to enable the predetermined shape of said cavity to be described by motions of said electrode, said predetermined shape including a stem portion and a head portion and corresponding to the predetermined shape of the fastener element, said head being shaped for engagement with a loop of a hook and loop fastener;

moving said shaped electrode into said surface of said mold body to form an initial chamber in said mold body;

moving said shaped electrode within said initial chamber in a set of motions to form said stem portion and said head portion and to enlarge said initial chamber to form said cavity;

returning said shaped electrode to remove said shaped electrode from said mold body;

delivering moldable resin to said cavity such that moldable resin is forced into said cavity;

solidifying said resin in said cavity to form a fastener element; and removing said fastener element from said cavity.

12. The method of claim 1 or 11 wherein said predetermined shape comprises a hook.

13. The method of claim 1 or 11 wherein said predetermined shape comprises a loop-engaging fastener shape selected from the group consisting of corkscrews, spirals, mushrooms and double-sided hooks.

14. A method for molding a fastener element having a predetermined shape including an undercut portion, the method comprising:

providing a mold body having a surface, said mold body consisting of a single, integral mold roll;

providing a shaped electrode having a length at least as deep as the cavity to be formed and having at least one transverse dimension smaller than the corresponding dimension of the cavity to be formed, the shape of the electrode selected to enable the predetermined shape of said cavity to be described by motions of said electrode, said predetermined shape including a stem portion, a head portion and an undercut portion, and corresponding to the predetermined shape of the fastener element, said head being shaped for engagement with a loop of a hook and loop fastener;

moving said shaped electrode into said surface of said mold body to form an initial chamber in said mold body;

moving said shaped electrode within said initial chamber in a set of motions to form said stem portion, said head portion and said undercut portion, and to enlarge said initial chamber to form said cavity, said set of motions including moving said shaped electrode substantially parallel to said surface and rotating said shaped electrode;

returning said shaped electrode to remove said shaped electrode from said mold body;

delivering moldable resin to said cavity such that moldable resin is forced into said cavity;

solidifying said resin in said cavity to form a fastener element; and removing said fastener element from said cavity.

* * * * *